(12) United States Patent  (10) Patent No.: US 7,660,115 B2
Franz et al.  (45) Date of Patent: Feb. 9, 2010

(54) FAN DOCKING COLLAR

(75) Inventors: John P. Franz, Houston, TX (US);
Joseph R. Allen, Tomball, TX (US);
Wade D. Vinson, Magnolia, TX (US);
Eric Mei, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 12/115,266

(22) Filed: May 5, 2008

(65) Prior Publication Data

US 2008/0303225 A1  Dec. 11, 2008

Related U.S. Application Data

(60) Provisional application No. 60/942,492, filed on Jun. 7, 2007.

(51) Int. Cl.
*H05K 7/20* (2006.01)

(52) U.S. Cl. .................. 361/695; 361/690; 415/119; 454/184; 165/122

(58) Field of Classification Search .......... 361/690, 361/692, 694, 695–697, 715, 719, 724–727, 361/831; 165/121–126, 165, 185, 80.3; 415/213.1, 415/214.1, 119, 220; 417/360, 423.14, 423.15, 417/423.1, 363; 248/603–606, 560; 454/184
See application file for complete search history.

(56) References Cited

U.S. PATENT DOCUMENTS

| 2,467,296 | A | * | 4/1949 | Doe ........................... 248/604 |
| 4,517,880 | A | * | 5/1985 | Buckner et al. ............. 454/184 |
| 6,457,543 | B1 | | 10/2002 | Wooldridge |
| 6,485,296 | B1 | | 11/2002 | Bender et al. |
| 6,927,976 | B1 | | 8/2005 | Malone et al. |
| 6,975,509 | B2 | | 12/2005 | Osborn et al. |
| 7,031,870 | B2 | | 4/2006 | Sharma et al. |
| 7,068,504 | B1 | | 6/2006 | Helgenberg et al. |
| 7,079,388 | B2 | | 7/2006 | Faneuf et al. |
| 7,186,075 | B2 | * | 3/2007 | Winkler et al. ............. 415/119 |
| 7,317,267 | B2 | * | 1/2008 | Schmid et al. ................ 310/51 |
| 2005/0170770 | A1 | | 8/2005 | Johnson et al. |
| 2005/0241810 | A1 | | 11/2005 | Malone et al. |
| 2007/0135032 | A1 | | 6/2007 | Wang |
| 2007/0171613 | A1 | | 7/2007 | McMahan et al. |

FOREIGN PATENT DOCUMENTS

DE  2420615 A * 11/1975
JP  401185144 A * 7/1989

* cited by examiner

*Primary Examiner*—Michael V Datskovskiy

(57) ABSTRACT

A fan docking collar for sealing between a fan housing of a fan and an enclosure wall to improve fan performance by preventing flow recirculation. The docking collar includes a pliable body that defines an opening for air flow. The body has a seal for mating with the fan housing and a rim for sealing against the enclosure wall.

16 Claims, 3 Drawing Sheets

FAN DOCKING COLLAR

CROSS-REFERENCE TO RELATED APPLICATIONS

This application claims priority of U.S. Provisional Application No. 60/942,492, filed Jun. 7, 2007, entitled "Fan Flow Seal Docking Collar."

BACKGROUND

Fans are often used as part of a cooling system to provide cooling air flow to an electronics enclosures by drawing air from outside into the enclosure. Such fans are typically mounted inside the enclosure with an inlet of the fan exposed to the space outside the enclosure through an opening in the enclosure wall. One cause of decreased performance and inefficiency in a fan-based cooling system is air that is recirculated from the fan exhaust to the fan inlet without first flowing through the electronics enclosure, thus decreasing the amount of cooling provided to the enclosure. Recirculation may be due to factors including poor sealing between the fan inlet and the enclosure wall.

Eliminating recirculation allows a fan to provide the same amount of cooling to the electronics enclosure while rotating at a lower speed, creating less acoustic noise and less vibration, and using less energy. Recirculation has been decreased in prior devices by using baffles to direct air flow and to create greater distances or more circuitous paths between the fan outlet and the fan inlet. However, those designs do not eliminate in gaps and cracks where air leaks can occur. In some instances, a fan is removably mounted such that it in the event of failure, the fan can be hot-swapped (i.e., removed and replaced) without powering down the enclosure. However, making a fan removable to accommodate hot swapping can result in even more gaps and cracks where air leaks can occur.

The need to eliminate recirculation is particularly important in cooling high density electronics enclosures which require more cooling than lower density enclosures. Often, high performance fans are used to provide increased cooling flow for high density enclosures. However, high performance fans achieve increased cooling flow in part by operating at higher speeds and/or using more efficient airfoil shaped blades, which creates higher pressure differentials between the inlet and outlet of the fan. Therefore, any air leaks become more acute and have a more significant impact on the overall cooling capacity of the fan-based cooling system.

BRIEF DESCRIPTION OF THE DRAWINGS

The accompanying drawings illustrate embodiments of an insulated motor bearing assembly described herein.

In the drawings.

DETAILED DESCRIPTION

Figure 1:
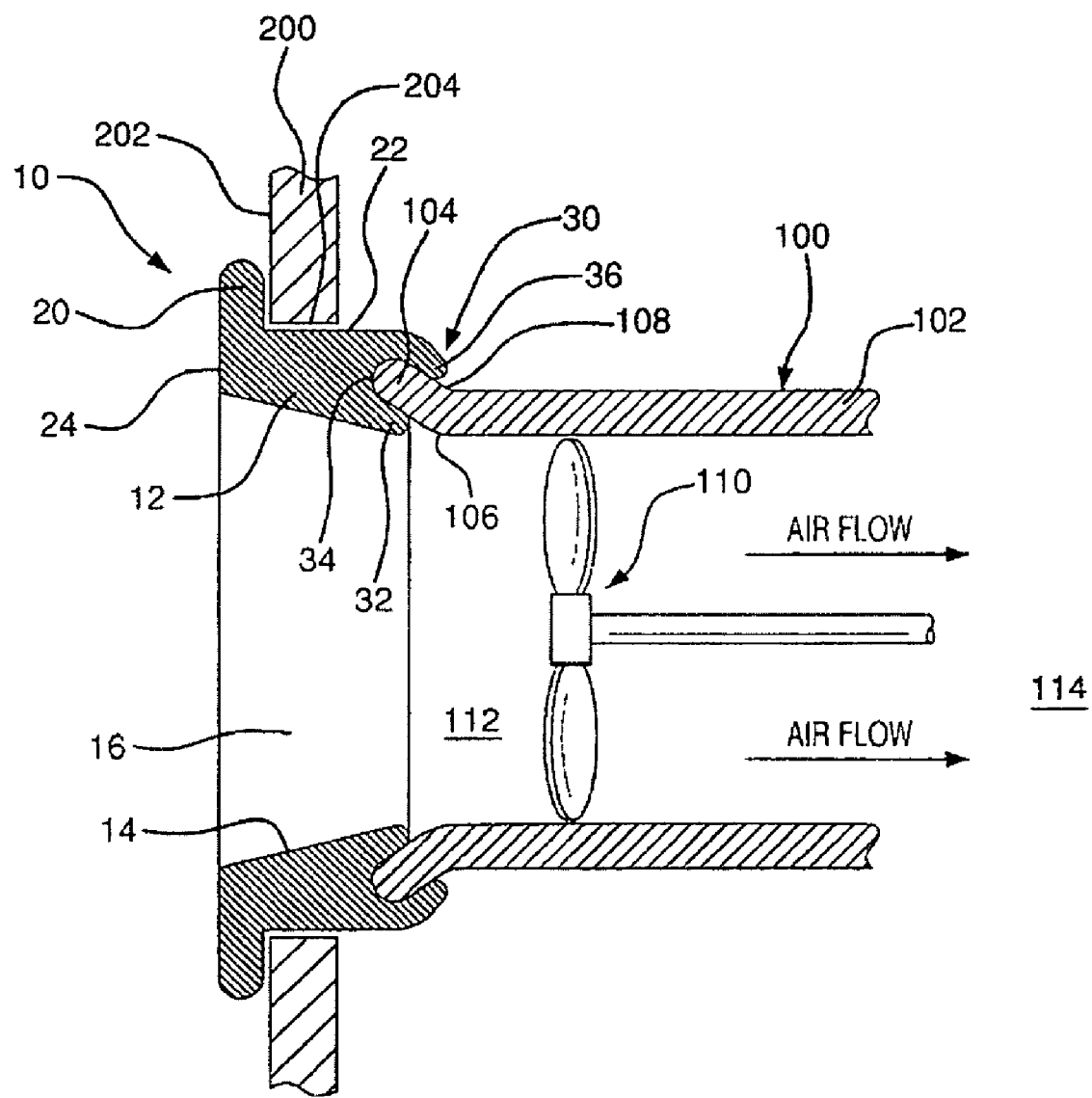
FIG. 1 is a cross-sectional view of an embodiment of a fan docking collar installed in an enclosure and associated with a fan.

There is shown in FIG. 1 a cross-sectional view of a fan docking collar 10 installed in an enclosure wall 200 and sealing between the enclosure wall 200 and a fan 100. In the illustrated embodiment, the docking collar 10 has a body 12 with a surface 24 facing outwardly from the enclosure wall 200 and a seal 30 facing inwardly from the enclosure wall 200. A peripheral wall 22 of the body 12 abuts the enclosure wall 200 and a tapered interior wall 14 of the body 12 extends from the seal 30 to the surface 24. The interior wall 14 defines a generally funnel shaped opening 16 for air flow to the fan 100.

The fan 100, representative of a typical fan, comprises a housing 102 having an interior wall 106, an exterior wall 108, and an end 104. The housing 102 bounds an inlet 112 and an outlet 114 of the fan 100, air being drawn through the fan 100 from the inlet 112 to the outlet 114 by a rotating fan blade 110.

The peripheral wall 22 of the collar 10 seals against the enclosure wall 200. A rim 20 extending around the perimeter of the body 12 is adapted to engage an exterior surface 202 the enclosure wall 200. The rim 20 provides an enhanced seal between the docking collar 10 and the enclosure wall 200 to reduce air recirculation between the fan outlet 114 and the fan inlet 112. Although the depicted embodiment shows the collar 10 as having a generally square outer shape, the outer shape of the collar can be any shape, including but not limited to square, rectangular, oblong, or round, to fit whatever fan opening exists in a particular enclosure wall 200. Additionally, the rim 20 need not be located to engage the exterior surface 202 of the enclosure wall 200, but can instead be located along the peripheral wall 22 of the docking collar 10 to seal against an interior surface 204 bounding the fan opening in the enclosure wall 200 similar to the manner in which an o-ring provides a seal.

Figure 2:
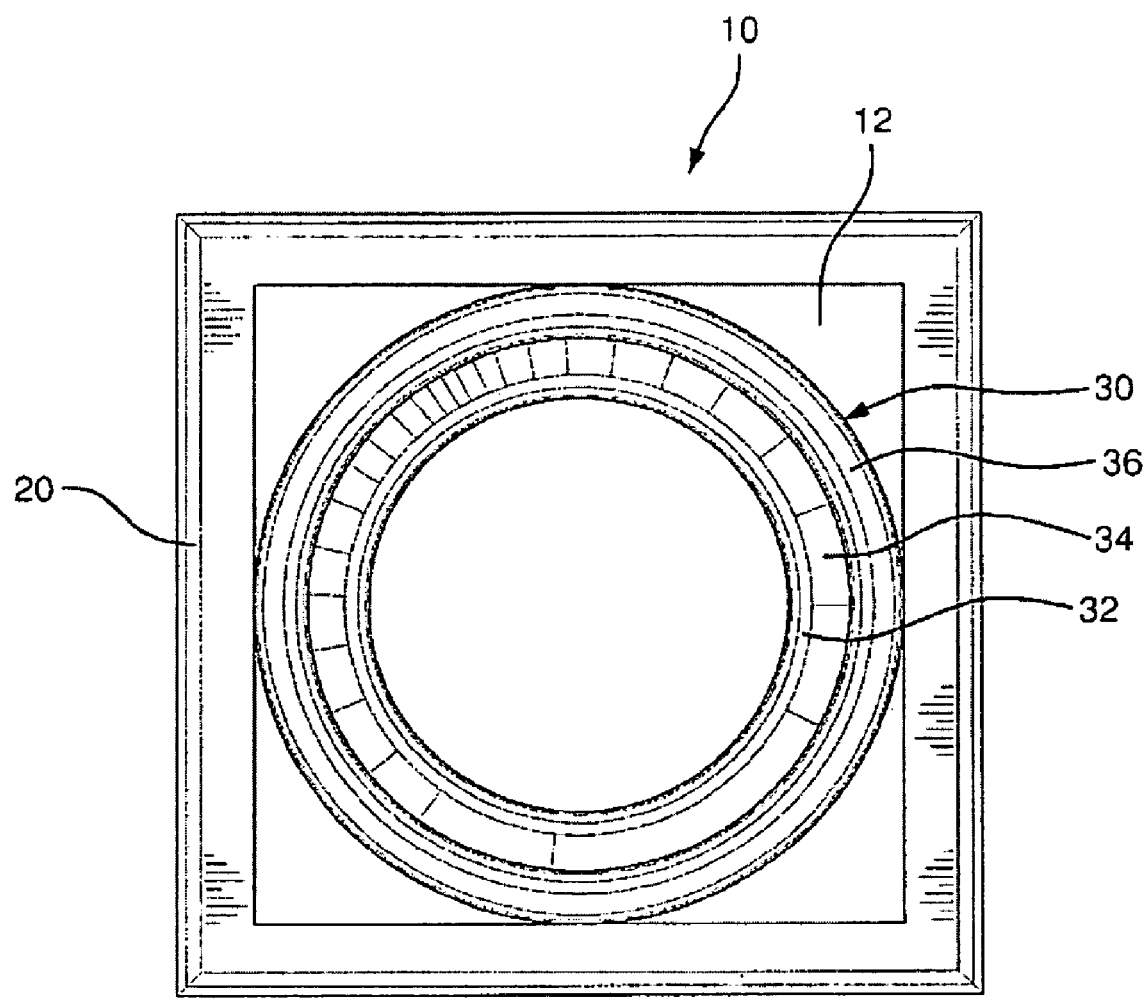
FIG. 2 is a rear perspective view of an embodiment of a fan docking collar.

The seal 30 provides a seal at the interface between the docking collar 10 and the fan 100 to reduce air recirculation between the fan outlet 114 and the fan inlet 112. In the embodiment depicted in FIGS. 1 and 2, the seal 30 comprises a first annular lip 32 for overlapping the interior wall 106 of the fan housing 102 when the fan 100 is installed, to enhance the seal between the collar 10 and the fan 100. The seal 30 further comprises a second annular lip 36 for overlapping the exterior wall 108 of the fan housing 102 when the fan 100 is installed to further enhance the seal between the collar 10 and the fan 100. The first lip 32 and the second lip 36 form a receiving groove 34 into which the end 104 of the fan housing 102 is received. When the fan 100 is installed into the collar 10, the combination of the first lip 32, the groove 34, and the second lip 36 creates a snug seal comprising a tortuous path that air would have to navigate in order to leak out through the seal 30 between the collar 10 and the fan 100.

Figure 3:
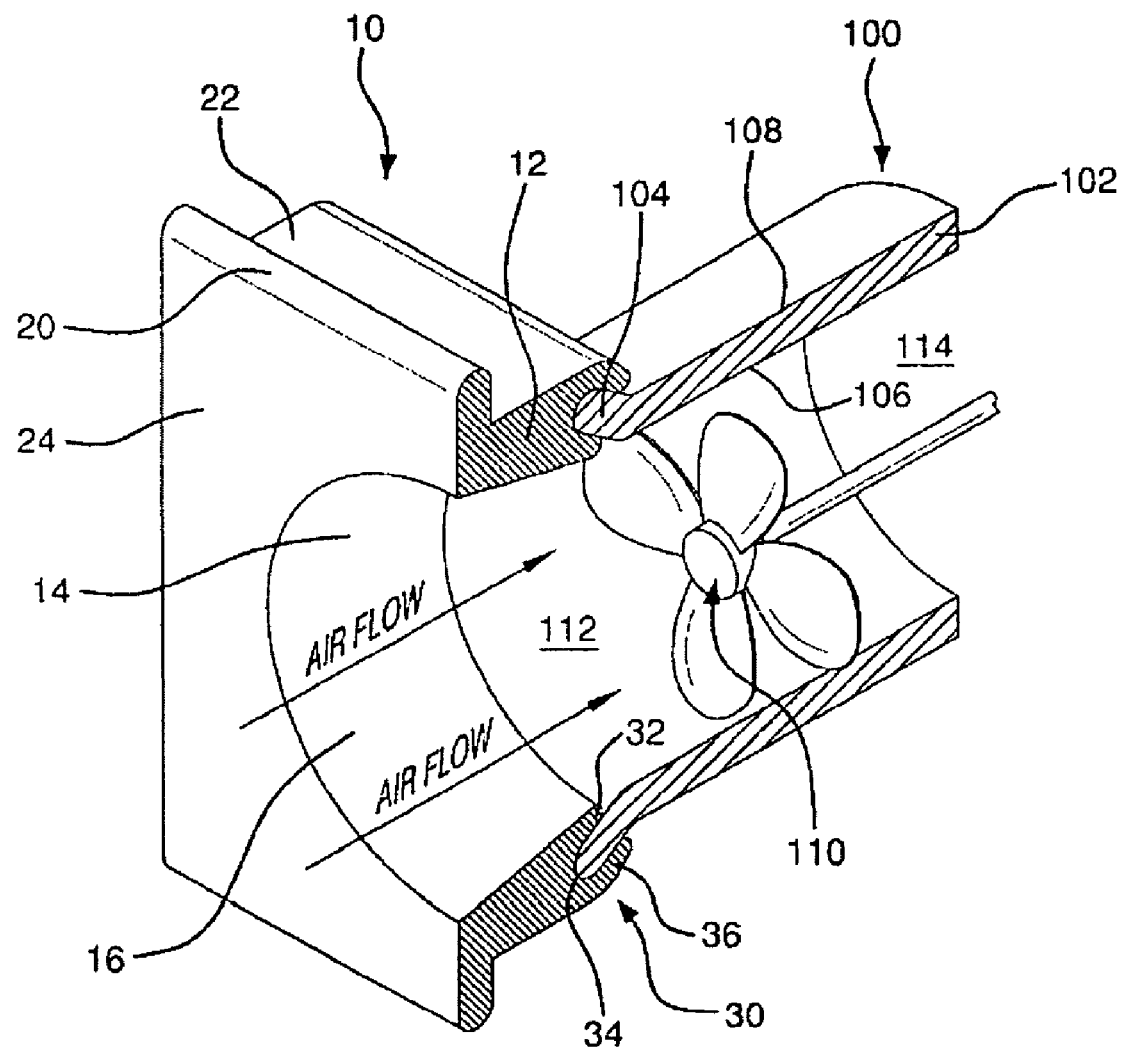
FIG. 3 is a front perspective partial cutaway view of an embodiment of a fan docking collar associated with a fan.

In the embodiment illustrated in FIGS. 1 and 3, the opening 16 has a diameter that tapers from a smaller dimension at the seal 30 to a larger dimension at the surface 24, the opening being defined by the tapered interior wall 14. The tapered wall 14 forms a funnel shaped inlet to the fan 100, which facilitates installation of the fan 100 from outside the enclosure wall 200. The diameter of the end 104 of the fan housing 102 is slightly larger than the diameter of the opening 16 at the location of the seal 30. Accordingly, when the fan housing 102 is inserted into the collar 10 so that the end 104 passes the first annular lip 32, the first lip 32 slips around the end 104 to overlap the interior wall 106 of the housing and the end 104 is captured in the groove 34.

The diameter of the groove 34 preferably closely matches the diameter of the fan inlet 112, and the tapered interior wall 14 and the first lip 32 are preferably shaped to provide a smooth transition into the fan 100 to minimize air turbulence that could cause acoustic noise or decreased fan performance.

In order for the collar 10 to most effectively provide a seal between the enclosure wall 200 and the fan inlet 112, and to substantially prevent recirculation of air from the fan exhaust 114, the fan collar 10 is preferably made from a pliable material. The pliable fan collar 10 enables the rim 20 and the peripheral wall 22 of the collar 10 to conform to variations in the enclosure wall 200 and the outer surface 202. The pliable fan collar 10 also enables the seal 30 to form a repeatable and effective joint with the fan housing 102 such that the fan 100 can be repeatedly replaced without substantially diminishing the ability of the collar 10 to continue to seal between the enclosure wall 200 and the fan housing 102. Further, the pliable fan collar 10 accommodates for movement caused by fan vibration so that the seal is maintained during operation of the fan 100 under vibration. Still further, the pliable fan collar 10 allows the fan 100 to be removed and replaced without compromising the seal between the enclosure wall 200 and the fan housing 102.

The pliable fan docking collar 10 is preferably made from a thermoplastic elastomer with a Shore A hardness in the range of about 10 to about 20, which allows sufficient compressive flexibility to create a tight seal yet remains sufficiently stable for assembly and operation under high temperatures such as may be experienced at the fan inlet 112. In one embodiment, a thermoplastic elastomer with a Shore A hardness of about 13 is used. Use of a compliant material in the preferred hardness range allows the docking collar 10 to provide a tight seal with both the enclosure wall 200 and the fan 100 despite variations in manufacturing tolerances of the enclosure wall 200 and the fan housing 102. Use of a compliant collar 10 provides an added benefit of vibration isolation between the fan 100 and the enclosure wall 200.

The fan docking collar 10 allows for improved fan performance by substantially eliminating leakage between the housing 102 of the fan 100 and the enclosure wall 200, thereby substantially eliminating recirculation of air from the fan outlet 114 back into the fan inlet 112. Improved fan performance, in turn, results in energy savings, increased reliability, and reduce acoustic noise because the fan 100 need not be operated at a higher speed than necessary to provide sufficient cooling air flow to the electronics enclosure.

What is claimed is:

1. A fan docking collar for sealing between a fan housing of a fan and an enclosure, comprising:
   a pliable body defining an opening for air flow, the body having a seal for mating with the fan housing and a rim for sealing against the enclosures
   wherein the seal comprises a first annular lip overlapping an interior surface of the fan housing.

2. The fan docking collar of claim 1, wherein the fan can be removed from the enclosure and replaced without compromising the seal between the fan housing and the enclosure.

3. The fan docking collar of claim 1, the seal further comprising a second annular lip overlapping an exterior surface of the fan.

4. The fan docking collar of claim 3, the seal further comprising a groove for receiving an end of the fan housing, the groove being located between the first lip and the second lip.

5. The fan docking collar of claim 1, wherein the pliable body is formed from a thermoplastic elastomer.

6. The fan docking collar of claim 1, the body further having a tapered interior wall bounding the opening to facilitate insertion of the fan into the collar.

7. The fan docking collar of claim 6, wherein the smallest diameter of the opening is located at the seal.

8. The fan docking collar of claim 1, the body further having a peripheral wall for sealing against the enclosure.

9. The fan docking collar of claim 1 wherein the rim seals against an exterior surface of the enclosure.

10. The fan docking collar of claim 1, where the rim seals against an interior surface bounding an opening in the enclosure wall.

11. A fan docking collar for sealing between a fan housing of a fan and an enclosure, comprising:
    a pliable body comprising a surface, a seal, and a tapered interior wall bounding an opening extending from the surface to the seal, the surface having a rim for sealing against the enclosure, the seal having a first annular lip for sealing against the fan housing, the opening being narrower at the seal than at the surface.

12. The fan docking collar of claim 11, wherein the fan can be removed from the enclosure and replaced without compromising the seal between the fan housing and the enclosure.

13. The fan docking collar of claim 11, wherein the pliable body is formed from a thermoplastic elastomer.

14. The fan docking collar of claim 11, the collar further comprising a peripheral wall for sealing against the enclosure.

15. The fan docking collar of claim 11, the seal further comprising a second annular lip overlapping an exterior surface of the fan housing.

16. The fan docking collar of claim 15, the seal further comprising a groove for receiving and end of the fan housing, the groove being located between the first lip and the second lip.

* * * * *

UNITED STATES PATENT AND TRADEMARK OFFICE
CERTIFICATE OF CORRECTION

PATENT NO. : 7,660,115 B2
APPLICATION NO. : 12/115266
DATED : February 9, 2010
INVENTOR(S) : John P. Franz et al.

It is certified that error appears in the above-identified patent and that said Letters Patent is hereby corrected as shown below:

In column 3, line 45, in Claim 1, after "enclosures" insert -- ; --.

In column 4, line 19, in Claim 9, delete "claim 1" and insert -- claim 1, --, therefor.

Signed and Sealed this

Eleventh Day of May, 2010

David J. Kappos
*Director of the United States Patent and Trademark Office*